(12) United States Patent
Milles

(10) Patent No.: US 6,463,476 B1
(45) Date of Patent: Oct. 8, 2002

(54) CONTROLLING CONGESTION IN AN ATM MODE

(75) Inventor: Olivier Milles, Issy les Moulineaux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/320,657

(22) Filed: May 27, 1999

(30) Foreign Application Priority Data

May 28, 1998 (FR) .......................................... 98 06766

(51) Int. Cl.[7] .............................................. G06F 13/00
(52) U.S. Cl. ...................................... 709/235; 370/233
(58) Field of Search ................................ 709/200, 201, 709/223, 224, 226, 227, 228, 235; 370/229, 232, 233, 235, 230, 252, 391, 412, 414

(56) References Cited

U.S. PATENT DOCUMENTS

| | | | | |
|---|---|---|---|---|
| 5,526,345 A | * | 6/1996 | Wallmeier | 370/428 |
| 5,602,830 A | * | 2/1997 | Fichou et al. | 370/232 |
| 5,636,212 A | * | 6/1997 | Ikeda | 370/233 |
| 5,724,513 A | | 3/1998 | Ben-Nun et al. | 709/234 |
| 5,734,650 A | * | 3/1998 | Hayter et al. | 370/392 |
| 5,802,040 A | * | 9/1998 | Park et al. | 370/232 |
| 5,818,815 A | * | 10/1998 | Carpentier et al. | 370/418 |
| 5,970,064 A | * | 10/1999 | Clark et al. | 370/351 |
| 6,005,862 A | * | 12/1999 | Yamamoto | 370/392 |
| 6,046,983 A | * | 4/2000 | Hasegawa et al. | 370/468 |
| 6,052,361 A | * | 4/2000 | Ansari et al. | 370/232 |
| 6,072,989 A | * | 6/2000 | Witters et al. | 455/423 |
| 6,094,687 A | * | 7/2000 | Drake, Jr. et al. | 709/241 |
| 6,175,570 B1 | * | 1/2001 | Cukier et al. | 370/230 |
| 6,330,222 B1 | * | 12/2001 | Ebisawa | 370/230 |

FOREIGN PATENT DOCUMENTS

WO    WO 96/29806    9/1996

* cited by examiner

Primary Examiner—Moustafa M. Meky
(74) Attorney, Agent, or Firm—Sughrue Mion, PLLC

(57) ABSTRACT

A method of controlling congestion in a node of an asynchronous transmission system in which cells forming packets are transmitted, wherein cells are accepted or rejected according to the peak cell rate (PCR) of the connection on which the cells are transmitted, and the peak cell rate is evaluated based on peak cell rate information negotiated with the system for the connection. When the first cell of a packet arrives, the evaluated peak cell rate of the cells of the packet and the remaining transmission capacity (RTC) at the node are compared, the latter being calculated as the difference between the possible cell rate of the node and the sum of the cell rates of the connections of the packets in process of transmission via the node. The method provides a simple way of effectively controlling congestion without having to transmit resource management information in dedicated cells.

12 Claims, 8 Drawing Sheets

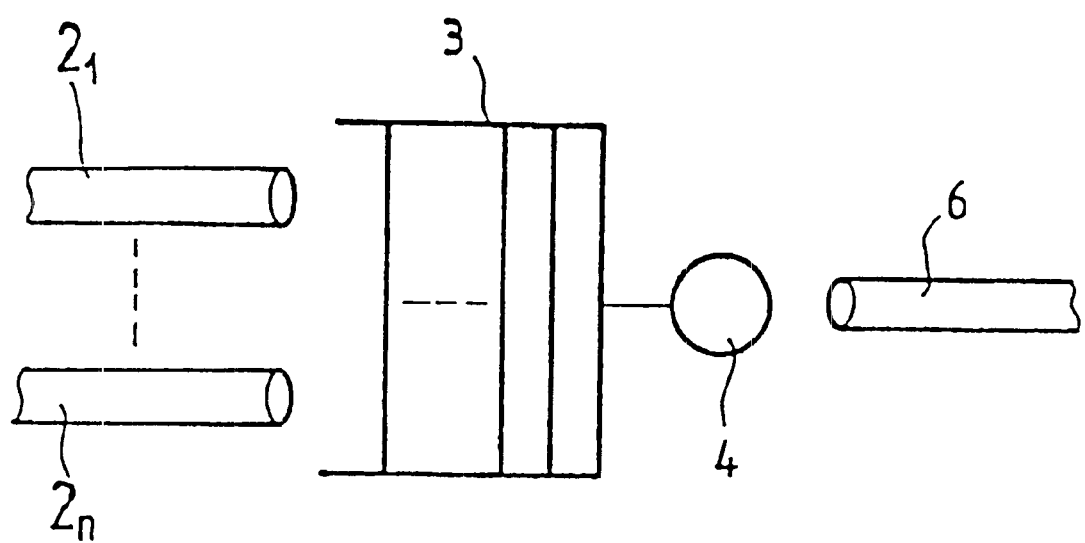

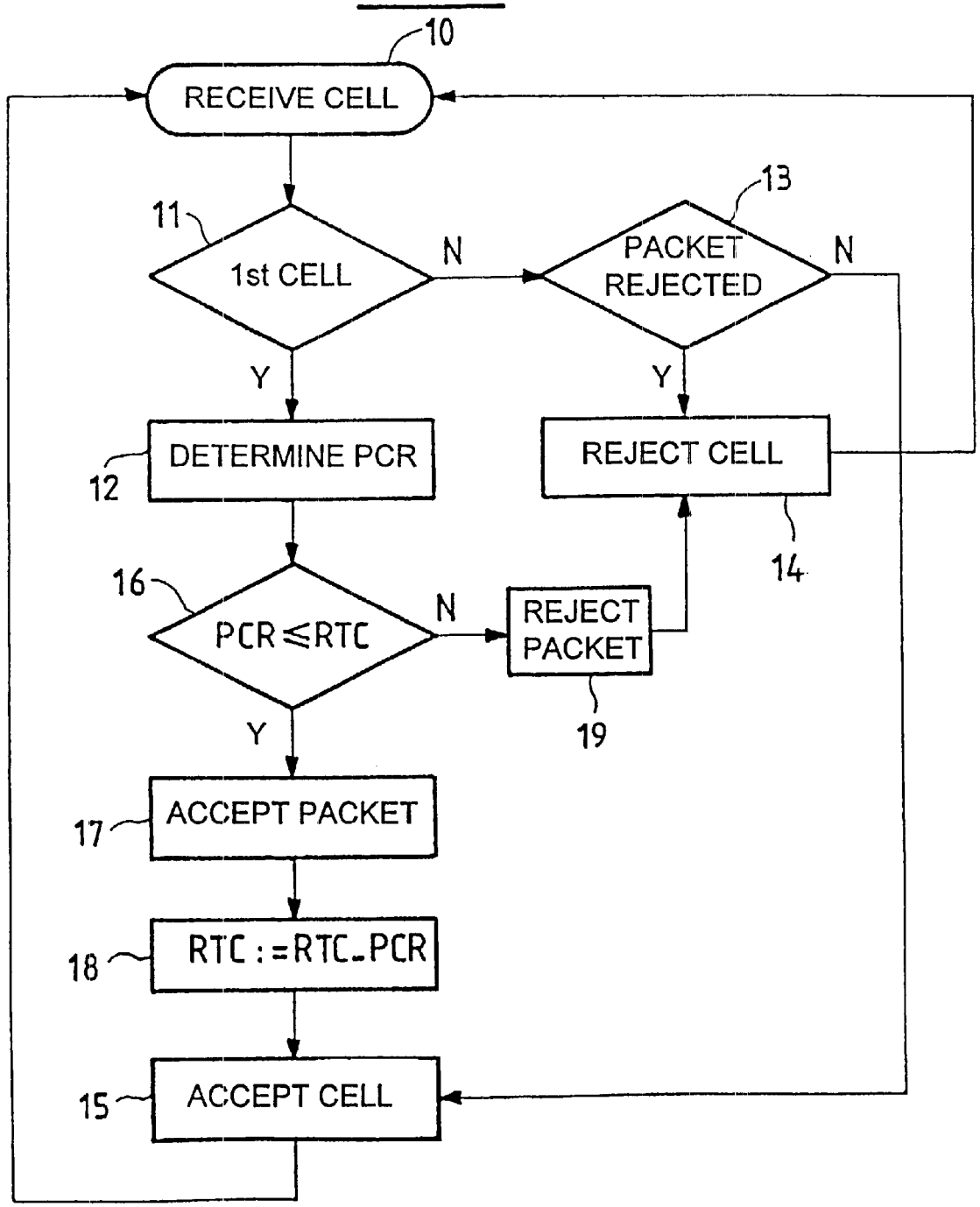

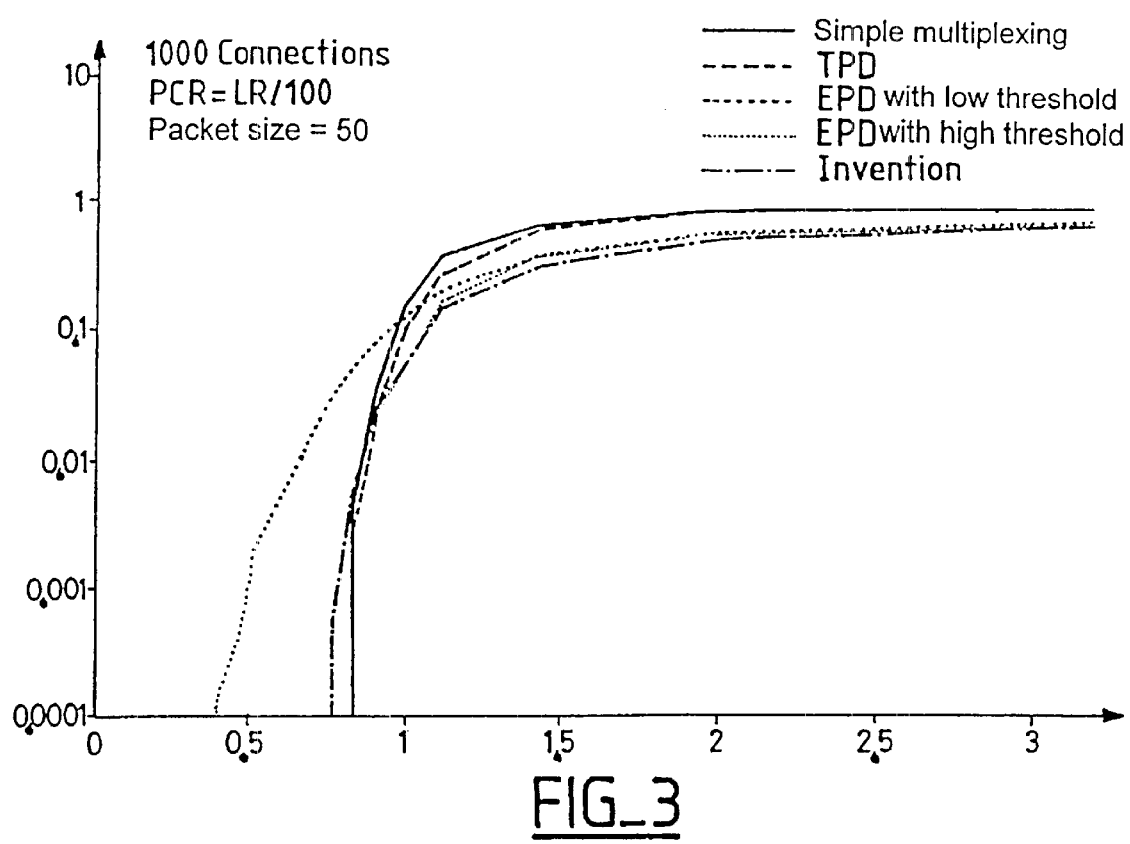
FIG_3

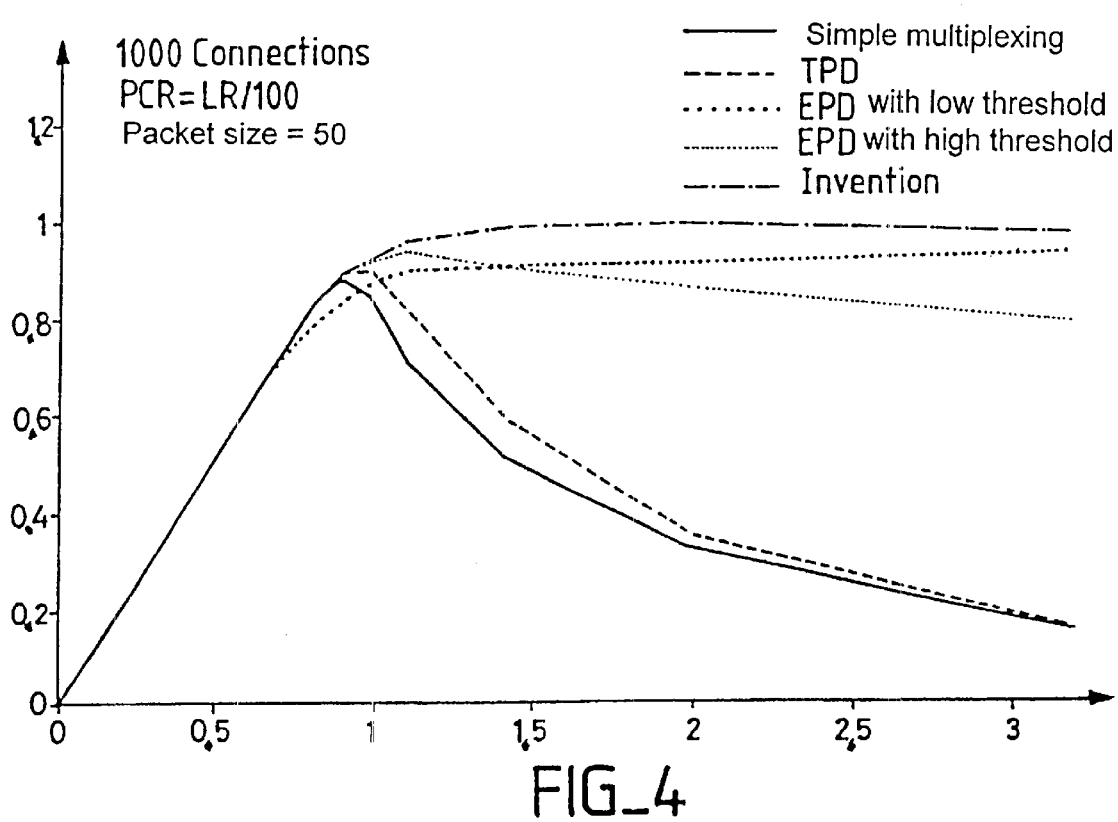
FIG_4

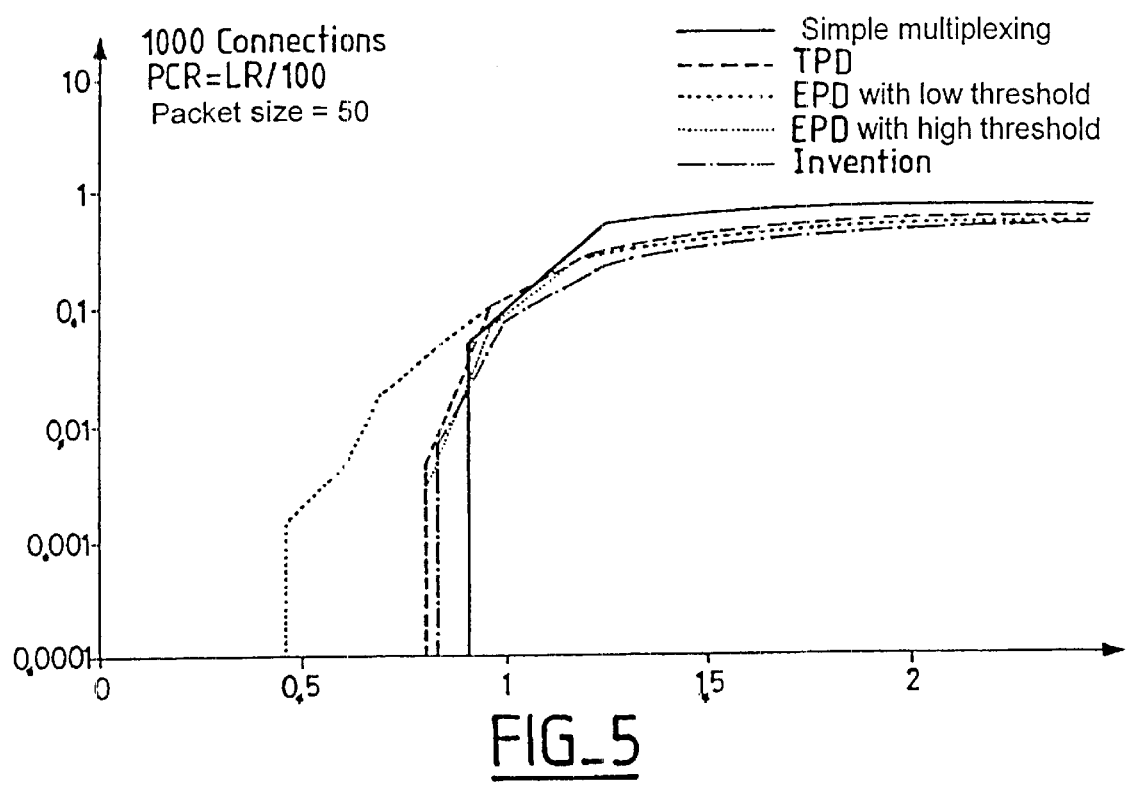
FIG_5

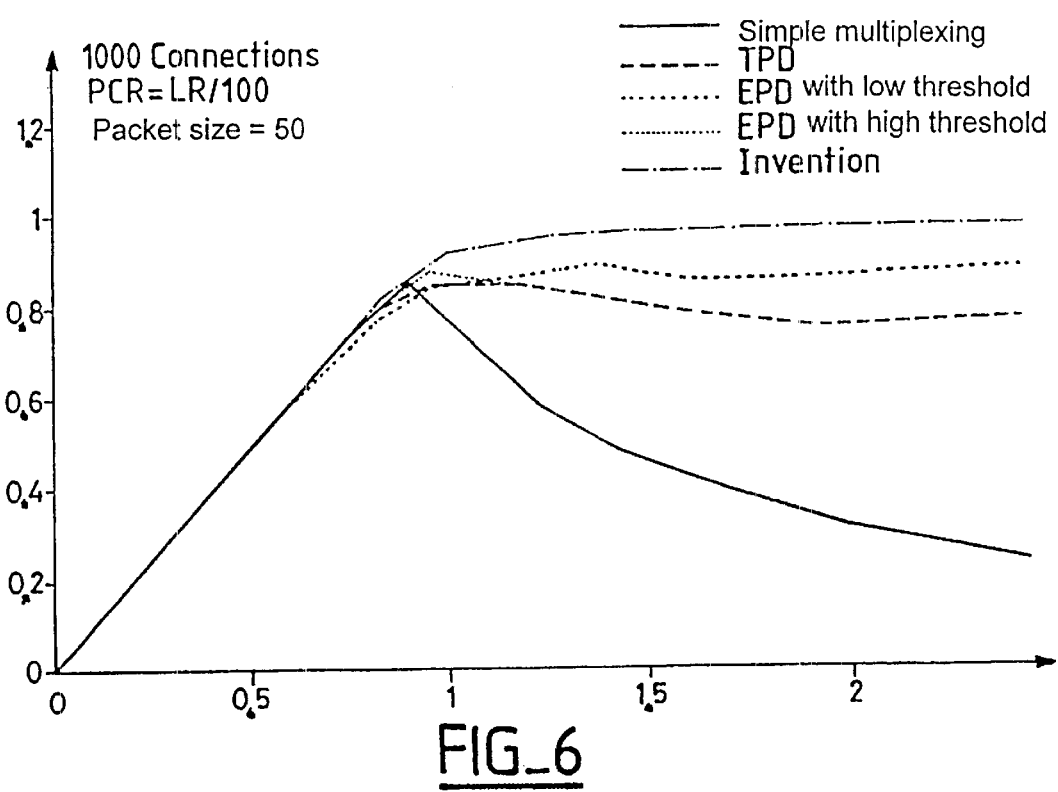
FIG_6

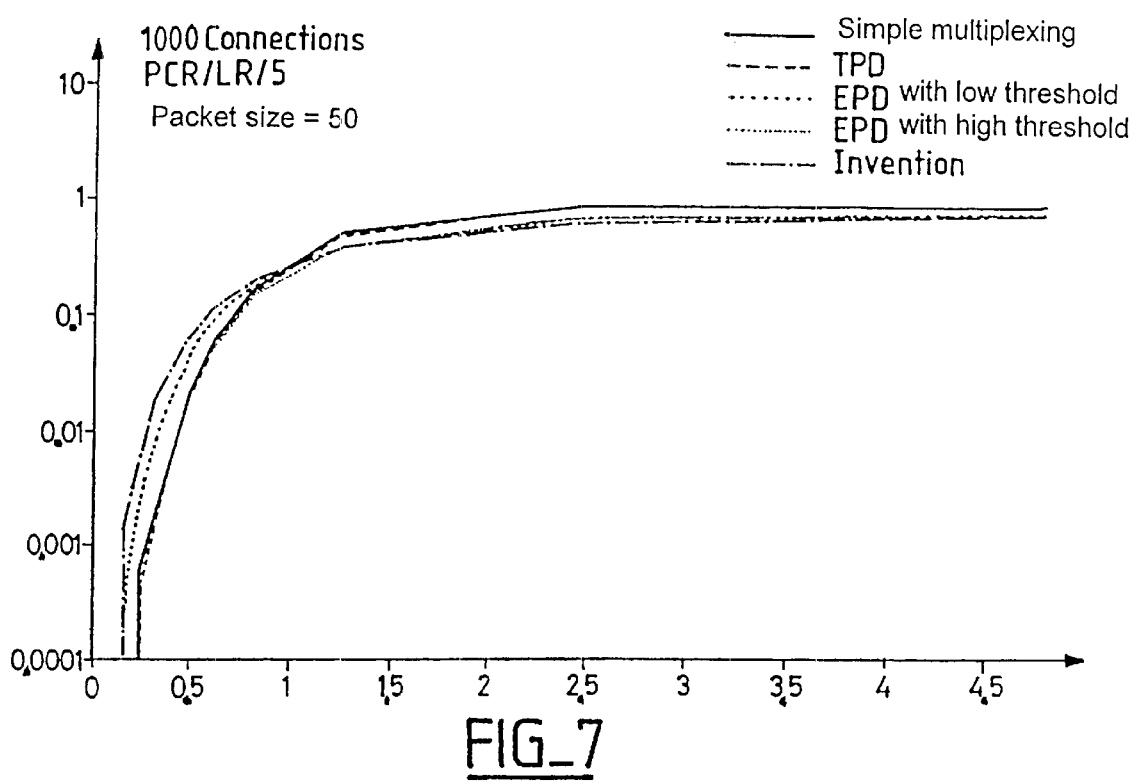

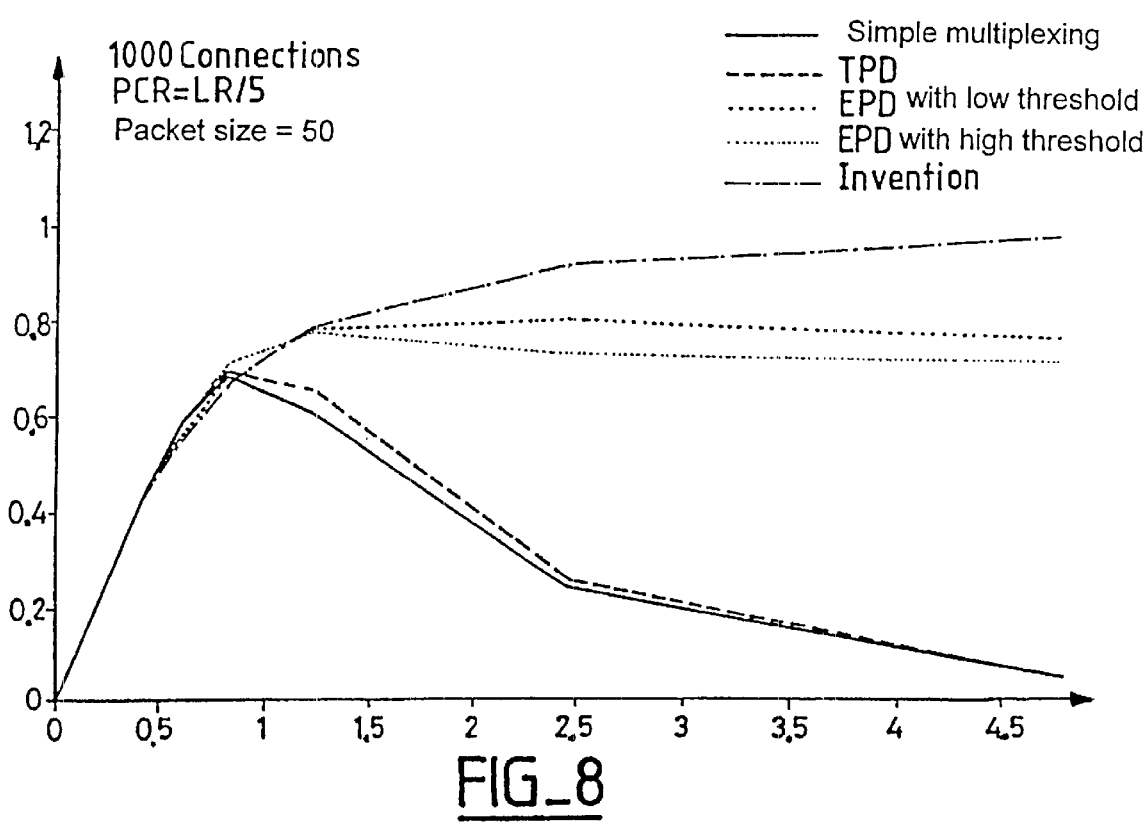
FIG_8

CONTROLLING CONGESTION IN AN ATM MODE

BACKGROUND OF THE INVENTION

The present invention consists in a method of controlling congestion in a node of an asynchronous transmission system.

The invention concerns asynchronous transfer mode (ATM) transmission. In this transmission mode, cells of fixed size are transmitted in a connection-oriented mode. A connection is set up by marking a path, i.e. a chain of identifiers. Locally, only a user's local identifier known as the VPVC (virtual path virtual channel) is used in an ATM node; identifiers are translated locally in each node to transmit the packets. For more details on the structure and operation of the ATM see the publications of the ITU, the ATM Forum or the ETSI.

ATM is currently the support for layer 2 of the ISO model for the Internet protocol (IP). An IP-ATM adaptation layer known as the ATM adaptation layer (AAL-5) is used for this purpose. In AAL-5, an IP packet is transported by segmenting it into ATM cells; an ITU recommendation proposes to introduce into the header of ATM cells a bit representative of the end of the IP packet, i.e. the last ATM cell of an IP packet. This AUU (ATM user to user indication) bit is used to mark the end of an IP packet; it is also used to mark the beginning of an IP packet in that the ATM cell following a cell with an AUU bit at 1 corresponds to the start of an IP packet. These AAL-5 functions are documented in ITU-T 1361, BisDN ATM Layer Specification, Helsinki, March 1993.

One problem encountered with ATM is controlling congestion at the nodes. The advantage of ATM is that the cell rate is flexible because transmission is asynchronous; locally, in a node having finite resources, this flexibility causes congestion control problems.

Various solutions to the problem of controlling congestion have been proposed. A first solution consists in not controlling congestion in the nodes, i.e. in multiplexing incoming cells blind. This solution has a high cost in terms of resources if it is to achieve adequate performance. New service models seek to provide more suitable solutions, in particular so-called "best effort" solutions, which take account of the fact that the same grade of service is not necessarily required by all types of application. "Packet discard" and "frame discard" solutions have been suggested, in particular at the suggestion of the ATM Forum.

One solution proposed in the document ATM Forum Traffic Management Specification 4.0 is known as tail packet discard (TPD). This entails rejecting or discarding all subsequent cells up to the end of the packet if a cell is rejected or discarded because of a buffer overflow. This solution uses the AUU bit to mark the end of a packet; after a cell is discarded, all subsequent cells having the same VPVC are discarded, until a cell is discarded whose AUU bit is set, which is the end of a packet. This solution recovers space in the buffer, given that a packet from which a cell has been eliminated is unusable by the application.

Another solution proposed in the document ATM Forum Traffic Management Group Living List, December 1997, pages 18–20, is known as early packet discard (EPD). The idea of this solution is to decide, as soon as reception of a packet begins, whether the cells constituting the packet must be accepted or not, depending on the space available in the buffer when the first cell is received. To this end an EPD threshold is defined in the buffer. When the first cell of a packet reaches the buffer it and all the subsequent cells of the packet are rejected if the buffer has already been filled beyond the EPD threshold. Conversely, the cell is accepted if the EPD threshold in the buffer has not been reached when the first cell arrives; this does not prejudge accepting subsequent cells of the packet.

The above solutions are not totally satisfactory. TPD is not optimal in that it is possible to accept most cells of a packet and still to have to retransmit the whole packet if the last cells are rejected; EPD is relatively inefficient in a small queue or if the transmission node is heavily loaded. It is also difficult to set the EPD threshold because it is sensitive to the size of the packets and to their mode of arrival. Statistical information on cell size and mode of arrival is generally used to set the EPD threshold.

A service model of the ATM layer known as ATM block transfer with immediate transmission (ABT/IT) has also been proposed and provides the facility to mark blocks in the ATM layer. The blocks are not necessarily tied to a higher level protocol data unit (PDU)—a packet in the case of the IP. The marking is done by inserting resource management (RM) cells which define the ends of the blocks and carry information on the cell rate of the block transmitted between two successive RM cells and optional block size information. This service model is described, for example, in the document ITU-T Recommendation 1.371, Toronto, September 1997, page 19. It is not used in current systems because of the complexity entailed in implementing this network solution. Also, inserting RM cells leads to an increase in traffic (overhead).

SUMMARY OF THE INVENTION

The invention proposes an ATM node congestion control solution enabling more efficient control than the prior art EPD and TPD solutions and which is simpler to implement than the ABT/IT solutions.

To be more precise, the invention proposes a method of controlling congestion in a node of an asynchronous transmission system in which cells are transmitted, characterized in that it consists in:

evaluating the cell rate of the connection from the peak cell rate negotiated for the connection, evaluating the remaining transmission capacity that the node can accept at the time concerned, and comparing the peak cell rate and the remaining transmission capacity and accepting or rejecting cells according to the result of the comparison.

In one particular embodiment, the method is applied to cells which form packets and is characterized in that it consists in performing these three operations when the first cell of each packet arrives.

The remaining transmission capacity at the node is preferably taken as equal to the difference between the maximum total cell rate that the node can accept and the sum of the cell rates of the packets in process of transmission via the node.

The packets in process of transmission via the node are advantageously packets whose last cell has not been transmitted.

In another embodiment, the packets in process of transmission via the node comprise packets whose last cell has not been transmitted and packets whose last cell has been transmitted in a time period less than the average time period between cells of the packet.

The method preferably comprises inserting spacers into at least one connection and the evaluation of the peak cell rate of said connection is corrected to allow for the introduction of said spacers.

It is also possible to reject all the cells of a packet whose first cell has been rejected.

BRIEF DESCRIPTION OF THE DRAWINGS FIGURES

Other features and advantages of the invention will become apparent on reading the following description of embodiments of the invention given by way of example and with reference to the accompanying drawings, in which:

FIG. 1 is a diagram showing a buffer in a node of an ATM network in which the invention can be implemented, FIG. 2 is a flowchart of the process carried out on receiving a cell, and FIGS. 3 to 8 show the results of simulating the invention.

DETAILED DESCRIPTION OF THE INVENTION

The invention proposes to control congestion using implicit cell rate information that is not conveyed by the ATM cells but which is deduced from cell rate information negotiated when setting up connections.

When a connection is set up in an ATM system, a peak cell rate (PCR) is negotiated for the connection and corresponds to the maximum cell rate authorized for the connection concerned. Experiments shows that the cells in a packet are generally sent at the cell rate offered to a terminal, i.e. substantially at the peak cell rate negotiated for the connection.

Alternatively, it is possible, on a given connection, to reduce the cell rate for more efficient use of the capacity of a transmission line by introducing cell spacers on entry into the network; this solution is described in French Patent Application FR-A-2 653 285 whose title in translation is "System for evaluating the cell rate of virtual circuits using an asynchronous time-division multiplex transmission channel"; see the above application for more details on the nature of the transformation used. In this case, the invention proposes to consider the reduced cell rate PCR' instead of the negotiated cell rate corresponding to the PCR. Both are system parameters known locally for the various connections.

FIG. 1 is a diagram showing a buffer of an ATM network node in which the invention can be implemented; FIG. 1 shows a set of incoming connections $2_1$ through $2_n$, a buffer 3 and a server 4 which transmits the cells contained in the buffer on a line 6 with known line cell rate. When a new cell of a new packet arrives on a given connection, the invention considers the cell rate required for the connection on which that cell arrives and compares that cell rate to the remaining transmission capacity (RTC) of the server.

The RTC is calculated from the cell rate of the server, which is known locally, and the sum of the cell rates of the active connections, i.e. the sum of the negotiated PCR or PCR' of each of the connections for which packets are in the process of transmission. It should be noted that the corresponding cell rate information is not used in calculating the RTC if a packet previously received has been rejected. The RTC calculated in this way is compared to the cell rate required for the new connection; if the server proves to have remaining capacity greater than the required cell rate the cell is accepted and the RTC is reduced accordingly. Otherwise, the cell is rejected and all subsequent cells of the packet are also rejected.

FIG. 2 is a detailed flowchart of the processing carried out when a cell is received. A cell is received in step 10; after a cell is received, in step 11, whether the incoming cell is the first cell of a new packet is determined; a new cell of a new packet arriving at the input of the node is identified as a new cell, for example by means of the AUU bit of the preceding cell. If the incoming cell is the first cell of a new packet the next step is step 12 and if not the next step is step 13.

In step 13, a cell is present of a packet whose first cell has already arrived; whether the first cell has been rejected is determined by consulting the activation bit; if it has been rejected the next step is step 14, where the cell is also rejected; as in the TPD, there is no point in continuing to transmit cells of a packet that will arrive incomplete in any event. After step 14, the process returns to step 10 for the next cell. Otherwise, the next step is step 15, in which the cell is accepted, unless the buffer overflows.

In step 12, a first cell of a packet is present. The implicit PCR is determined by looking up system tables and on the basis of the VPVC of the cell. The next step is step 16. If necessary, the PCR is corrected, as explained above.

In step 16, the PCR determined in step 12 is compared to the RTC. If the PCR is less than or equal to the RTC the next step is step 17. Otherwise, the next step is step 19.

In step 17, it is assumed that the packet has been accepted and the corresponding activation bit is updated to a first logic value such that the subsequent cells are also accepted. The next step is step 18.

In step 18, the RTC is updated to take account of the acceptance of the cell and thus of the use of capacities corresponding to the PCR. A new RTC is calculated using the formula:

$$RTC=RTC-PCR$$

The next step is step 15 in which the cell is accepted unless the buffer overflows; the process then returns to step 10 to wait for the next cell.

In step 19, a first cell of a packet is present and is about to be rejected because the capacities of the node cannot guarantee that it will be routed successfully. The activation bit is updated to a second logic value such that the subsequent cells are rejected in step 13. The next step is step 14. Updating the activation bit enables rejection of the subsequent cells of the packet.

Thus the invention enables the use of the resources of the transmission node to be predicted at any time. It provides a solution that is independent of the size of the packets. It does not prejudge overflow of the buffer; however, overflow of the buffer is improbable.

Updating the RTC on receiving the last cell of a packet, identified by an AUU bit, is described next. On receiving a cell of this kind, if the corresponding packet has been rejected, all that is necessary is to set to a given logic value a bit indicating that the next cell is the first cell of a packet. This ensures that the next packet can be processed and routed if resources are again available.

On the other hand, if the packet corresponding to the last cell has been accepted, it is necessary to set to a given logic value a bit indicating that the next cell is the first cell of a packet and also to update the RTC to indicate that the whole of the packet has been routed and that the corresponding resource can be used for another packet. Two embodiments are feasible. In a first embodiment a new RTC is calculated using the following formula as soon as the end of packet cell is received:

$$RTC=RTC+PCR$$

where PCR is the peak cell rate for the connection carrying the cell. This embodiment, known as immediate release, has the advantage of simplicity.

In another embodiment, a new RTC is calculated using the same formula but after waiting for a time period corresponding to the time between arrivals of the cells of the packet, i.e. after a time period 1/PCR. This solution is more secure, especially with small packets, and prevents untimely filling of the buffer. The deferred release of this embodiment avoids release before effective transmission of the cell.

The immediate release embodiment is acceptable for packet sizes corresponding to the packet sizes of the IP, namely 30 to 200 cells. The fact that resources are not allocated to the last cell is accepted given the load capacity of the server, which is always less than 100%.

In both cases, it is clear how the RTC is updated after a packet passes through and how the next packet can be routed. It should again be noted that initially the RTC is initialized to the capacity of the server. It is continuously updated in accordance with the activity of the server.

The solution of the invention is simpler to implement than the ABT/IT solution in that it uses information that is already present and which the terminals can use. Also, using implicit cell rate information does not lead to any traffic increase (overhead). The solution performs better than the EPD solution and in particular is more robust relative to the size of the cells and can be used for small buffers. It has a particular advantage in real time systems, which use small buffers.

The process shown in FIG. 2, like the release process, is advantageously executed within one cell period at most. A periodic re-initialisation procedure is provided, if necessary, for surviving circumstances such as infinite packet length, RTC calculation error, etc.

The invention uses implicit cell rate information to control congestion. In that it works on the cell rates, it is reliable and limits the risk of buffer overflow.

FIGS. 3 to 8 show the results of simulating the invention compared to the EPD and TPD mechanisms. The following hypotheses were used for the simulation:

1000 connections,
packet length: 50 cells or 1000 cells,
connection PCR: line cell rate/100 or line cell rate/5,
buffer size: 64 cells,
TPD threshold: 64 cells, and
EPD threshold: 5 or 50 cells.

The results are expressed in the form of the Packet Error Ratio (PER) which is the ratio:

number of incoming packets−number of packets transmitted number of incoming packets The PER represents the end to end efficiency of the ATM system.

The "goodput" criterion is also used and is defined as the ratio:

number of packets integrated at output×packet size line cell rate

Each output load is representative of the use of the system and of the filtering effected by the congestion control mechanism. This parameter is important because an ATM transmission system is made up of a large number of nodes; it prevents routing of partial packets, which is of no utility because an incomplete packet is retransmitted.

Each figure shows direct multiplexing in continuous line, TPD in long dashed line, EPD with a low threshold of 5 cells in medium-length dashed line, EPD with a high threshold of 50 cells in short dashed line and the method of the invention in chain-dotted line.

FIGS. 3 and 4 concern a low PCR (line cell rate/100) and small packets (50 cells). FIG. 3 plots on the abscissa axis the input load, normalized relative to the output line cell rate; the PER is plotted on the ordinate axis. FIG. 4 plots on the abscissa axis the input load, normalized relative to the output line cell rate; the "goodput" is plotted on the ordinate axis.

FIGS. 5 and 6 are analogous to FIGS. 3 and 4 but for a high PCR (line cell rate/5) and large packets (1000 cells).

FIGS. 7 and 8 are analogous to FIGS. 3 and 4 but for a high PCR (line cell rate/100) and small packets (50 cells).

FIGS. 3 to 8 show that the TPD or EPD mechanism with a high threshold works well under low load conditions. However, the method of the invention and to a lesser degree the EPD solution with a low threshold achieve better results with a high load. The method of the invention provides the best results over a wide range of operating conditions. It also achieves the best performance in terms of "goodput".

Of course, the present invention is not limited to the examples and embodiments described and represented but is open to many variations that will suggest themselves to the skilled person. Thus it can be implemented for cells that do not form packets, by applying the method of the invention to each cell. It is also possible not to reject systematically the subsequent cells of a packet should this be useful for a given transmission. The invention can be combined with priority management mechanisms, for example based on the RTC, by conditioning acceptance of a packet to the nature of a connection below a particular RTC.

What is claimed is:

1. A method of controlling congestion in a node of an asynchronous transmission system in which cells received via at least one connection are transmitted by said node, comprising:

determining a required cell rate of the connection from a peak cell rate negotiated for the connection;

determining a remaining transmission capacity that the node can accept during a time when cells are being received via said connection; and comparing the required cell rate and the remaining transmission capacity, and accepting or rejecting received cells according to a result of the comparison.

2. A method according to claim 1, the cells being transmitted as packets, wherein the method is performed when a first cell of each packet arrives at the node.

3. A method according to claim 2, wherein the remaining transmission capacity at the node is a difference between a maximum total cell rate that the node can accept and a sum of cell rates of packets currently being transmitted via the node.

4. A method according to claim 3, wherein the packets currently being transmitted via the node are packets whose last cell has not been transmitted.

5. A method according to claim 3, wherein the packets currently being transmitted via the node comprise packets whose last cell has not been transmitted and packets whose last cell has been transmitted in a time period less than the average time period (PCR) between cells of the packet.

6. A method according to claim 1, further comprising inserting spacers into at least one connection and correcting the determining of the required cell rate of the connection to allow for the inserting of the spacers.

7. A method according to any one of claims 2 to 6, further comprising rejecting all cells of a packet whose first cell has been rejected.

8. A method of controlling congestion in a node of an asynchronous transmission system in which cells received via at least one connection are transmitted by a node, comprising:

determining a required cell rate of the connection from a peak cell rate negotiated for the connection;

determining a remaining transmission capacity that the node can accept; and comparing the required cell rate and the remaining transmission capacity, and accepting or rejecting received cells based on the comparing.

9. A method of controlling congestion in a node of an asynchronous transmission system in which cells received via at least one connection are transmitted by a node, comprising:

receiving a current cell;

determining whether the current cell is a first cell of a new packet;

if the current cell is determined to not be the first cell of a new packet, rejecting the current cell if the first cell has been rejected, or accepting the current cell if the first cell has not been rejected;

if the current cell is determined to be the first cell of a packet:

determining an implicit peak cell rate for a connection on which the current cell is being transmitted, using at least one of a system look-up table and a user's local identifier;

comparing the implicit peak cell rate to a remaining transmission capacity at the node;

if the implicit peak cell rate is less than or equal to the remaining transmission capacity, updating a first logic value so that subsequent cells of the packet are accepted, diminishing the remaining transmission capacity by an amount corresponding to the implicit peak cell rate, and accepting the current cell; and if the implicit peak cell rate is greater than the remaining transmission capacity, updating the first logic value so that subsequent cells of the packet are rejected.

10. The method according to claim 9, further comprising, if the current cell is a last cell of a current packet, setting a second logic value indicating that a next-received cell is a first cell of a next packet.

11. The method according to claim 10, further comprising, upon the setting of the second logic value, increasing the remaining transmission capacity by an amount corresponding to the implicit peak cell rate.

12. The method according to claim 11, wherein the increasing of the remaining transmission capacity is performed after waiting for a time period corresponding to a time between arrivals of cells of the packet.

* * * * *